(12) United States Patent
Horie et al.

(10) Patent No.: US 7,678,497 B2
(45) Date of Patent: Mar. 16, 2010

(54) MULTIPLE CELL BATTERY

(75) Inventors: Hideaki Horie, Yokosuka (JP);
Takamitsu Saito, Yokohama (JP);
Osamu Shimamura, Yokohama (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 1100 days.

(21) Appl. No.: 11/012,182

(22) Filed: Dec. 16, 2004

(65) Prior Publication Data
US 2005/0233210 A1   Oct. 20, 2005

(30) Foreign Application Priority Data
Dec. 18, 2003   (JP) ............... P 2003-420741

(51) Int. Cl.
*H01M 2/26* (2006.01)
(52) U.S. Cl. ............... 429/152; 429/149; 429/156; 429/157; 429/158; 429/160; 429/162
(58) Field of Classification Search .......... None
See application file for complete search history.

(56) References Cited

U.S. PATENT DOCUMENTS

| | | | | |
|---|---|---|---|---|
| 4,515,872 A | * | 5/1985 | Okano | 429/65 |
| 5,350,645 A | * | 9/1994 | Lake et al. | 429/124 |
| 5,563,002 A | * | 10/1996 | Harshe | 429/7 |
| 6,001,497 A | * | 12/1999 | Okutoh | 429/7 |
| 2002/0051904 A1 | * | 5/2002 | Itoh et al. | 429/149 |

FOREIGN PATENT DOCUMENTS

| | | | |
|---|---|---|---|
| JP | 8-241705 | | 9/1996 |
| JP | 2003-045383 | * | 2/2003 |

OTHER PUBLICATIONS

Kono, Michiyuki., et al. "Network Polymer Electrolytes with Free Chain Ends as Internal Plasticizer." J. Electrochem. Soc., vol. 145, No. 5, May 1998, pp. 1521-1527.

* cited by examiner

*Primary Examiner*—Jonathan Crepeau
*Assistant Examiner*—Tony Chuo
(74) *Attorney, Agent, or Firm*—McDermott Will & Emery LLP

(57) ABSTRACT

A battery including: a solid electrolyte film; and a plurality of unit cells formed thereon and connected in parallel. Each of the unit cells consists of: a positive electrode provided on one side of the solid electrolyte film; a negative electrode provided on the other side of the solid electrolyte film at a position opposite to the positive electrode; and a part of the solid electrolyte film sandwiched between the positive electrode and the negative electrode.

6 Claims, 3 Drawing Sheets

MULTIPLE CELL BATTERY

BACKGROUND OF THE INVENTION

1. Field of Invention

The present invention relates to a battery.

2. Description of Related Art

In recent years, with a background of increasing environmental protection activities, introduction of electric vehicles (EV), hybrid electric vehicles (HEV), and fuel cell vehicles (FCV) has been demanded. Secondary batteries for feeding electrical power to driving motors of such vehicles are required to have high-energy density which is unachievable with a single battery. The batteries in practical use for these applications are usually a plurality of unit cells connected in series and/or in parallel.

However, these batteries have a problem in that, if one of the unit cells connected in series and/or in parallel fails or becomes defective, the entire battery is no longer be unusable.

Countermeasures have been taken to avoid this situation, improving connection arrangement between unit cells.

Japanese Patent Application Laid-Open Publication No. H8(1996)-241705 discloses a battery which consists of series-connected groups of parallel-connected unit cells. In this battery, each unit cell is connected to at least one unit cell in parallel. Therefore, even when one of the unit cells fails or becomes defective, charge/discharge can still be carried out in the other unit cell connected thereto in parallel. Hence, the entire battery remains usable.

SUMMARY OF THE INVENTION

However, the unit cells of the above-described battery are manufactured separately and thus have different properties. This causes biased charge/discharge loads on any one of the parallel-connected unit cells, which leads to a rapid deterioration in a charge-discharge cycle life of the unit cell. In order to avoid this problem, it is required to check at assembly the properties of each unit cell before connecting them in parallel, and this increases manufacturing costs.

Although the battery remains usable even in the case that any one of the unit cells becomes nonconductive, if any one of the unit cells is short-circuited, a current flows, bypassing normal unit cells. This may results in a reduction in voltage of the entire battery.

An object of the present invention is to provide a battery containing unit cells connected to each other in parallel, which can be used continuously without causing excess loads on normally-operating unit cells and without losing capabilities of the whole battery even when any one of the unit cells becomes defective.

An aspect of the present invention is a battery comprising: a solid electrolyte film; and a plurality of unit cells formed on the solid electrolyte film and connected in parallel, each of the unit cells comprising: a positive electrode provided on one side of the solid electrolyte film; a negative electrode provided on the other side of the solid electrolyte film at a position opposite to the positive electrode; and a part of the solid electrolyte film sandwiched between the positive electrode and the negative electrode.

BRIEF DESCRIPTION OF THE DRAWINGS

The invention will now be described with reference to the accompanying drawings wherein.

DETAILED DESCRIPTION OF THE PREFERRED EMBODIMENT

Figure 1:
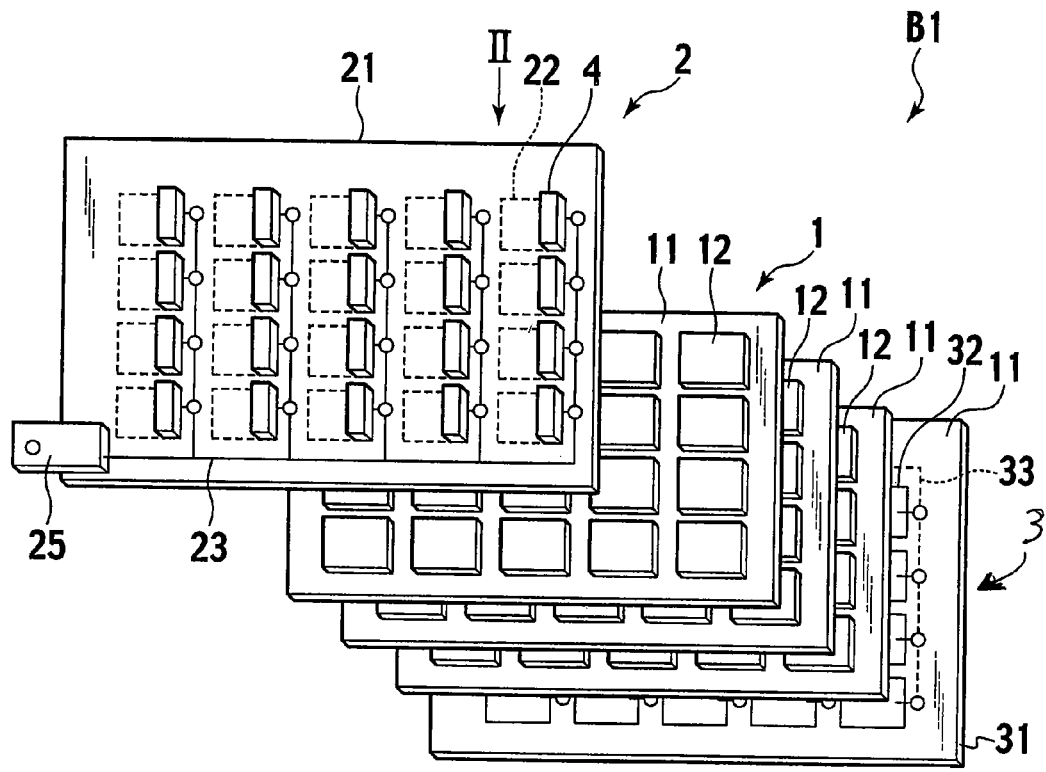
FIG. 1 is an exploded perspective view of a battery according to the present invention.
Figure 2:
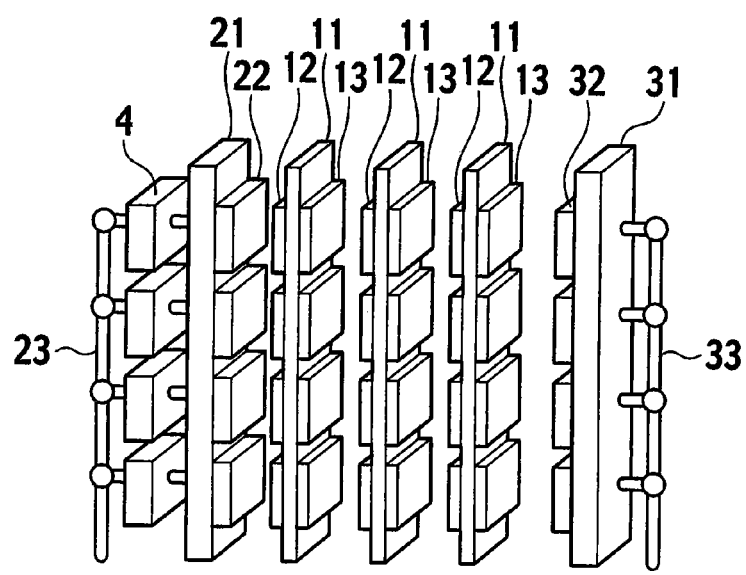
FIG. 2 is an exploded perspective view schematically showing (a row of) unit cells aligned in a direction shown by the arrow II in FIG. 1.

Embodiments of the present invention will be explained below with reference to the drawings, wherein like members are designated by like reference characters.

First Embodiment

In a battery B1 according to the first embodiment of the present invention, a plurality of cell assemblies 1 are stacked on one another and sandwiched between collector electrode plates 2 and 3. On the collector electrode plate 2 on the positive electrode side, connection interrupters 4 are provided for positive electrodes, respectively.

Each of the cell assemblies 1 has a plurality of positive electrodes 12 and negative electrodes 13. The positive electrodes 12 are formed separately on one side (the first side) of a solid electrolyte film 11, and the negative electrodes 13 are formed separately on the other side (the second side) of the same solid electrolyte film 11 at positions opposite to the respective positive electrodes. These pairs of the positive electrodes 12 and negative electrodes 13 together with one common solid electrolyte film 11 sandwiched therebetween form a plurality of cells, each of which serves as a unit cell constituting the battery.

The solid electrolyte films 11 are stacked on one another so that the positive electrodes 12 of each solid electrolyte film 11 come into contact with the negative electrodes on the neighboring solid electrolyte film 11, forming a plurality of parallel lines of series-connected unit cells extending in a direction perpendicular to the films 11. A plurality of rows of unit cells thus formed are connected to each other in parallel with wirings 23 and 33 which are respectively arranged on the collector electrode plates 2 and 3 sandwiching the rows of cells.

The rows of cells connected to each other in parallel, each of which includes the plurality of series-connected unit cells, thus form a battery. In this embodiment, the battery is a lithium ion secondary battery using a solid polymer electrolyte.

Further details of each component of the battery are described below.

First of all, the solid electrolyte film 11 is solid type polymer electrolyte which actually does not contain any solvent. Sticky polymer electrolyte containing polymer as a main ingredient is used for the solid electrolyte film 11.

Main ingredient of the solid electrolyte film 11 is, for example, polyalkylene oxide such as polyethylene oxide and propylene oxide, acrylnitorile-based polymer such as acrylonitrile butadiene rubber, acrylonitrile butadiene styrene resin, or polymers such as cross-linked polyether. The solid electrolyte film 11 is constructed by forming the material primarily containing the ingredient into a film shape, such as a thin-plate shape.

Among the above polymer materials, cross-linked polyether is particularly preferred. Cross-linked polyether includes, for example, polyethylene oxide (PE)-based polymer and polypropylene oxide (PO)-based polymer stated in J. Electrochem, Soc. 145, 1521-1527 (1998). Even more preferred is a polymer obtained as follows. Statistical copolymer of polyethylene oxide and polypropylene oxide is cross-linked using triol, esterified by unsaturated fatty acid, and then alkoxylated. Polymer obtained from polyether triol as above includes partially methylated polyether acrylate.

The polymers compounded as above using raw material monomer having a carbon-carbon dual bond within a molecule dissolves lithium salt such as LiBF4 very well. In addition, even after a solvent is fully removed by heating and drying, such polymers do not lose stickiness and are highly elastic, whereby the polymers can be formed into a film shape.

The solid electrolyte film 11 is formed as follows. A mixture of a polymerization initiator and a solvent is formed into a film and then polymerized by heating. In this process, the solvent is completely removed. The solid electrolyte film 11 may contain lithium salt or the like.

The positive electrodes 12 and negative electrodes 13 are formed on the solid electrolyte film 11 by using inkjet technology. (Details are described later.) The positive electrodes 12 contain a positive electrode active material, and the negative electrodes 13 contain a negative electrode active material.

The positive electrode active material includes Li—Mn based composite oxide such as $LiMn_2O_4$ and Li—Ni based composite oxide such as $LiNiO_2$. Two or more kinds of positive electrode active materials can be used together.

The negative electrode active material includes a crystalline carbon material and non-crystalline carbon material, and the specific examples are natural carbon and hard carbon. Two or more kinds of negative electrode active materials can be used together.

The positive and negative electrode active materials are sprayed on the solid electrolyte film 11 to form electrodes (hereinafter referred to as the positive and negative electrodes). Slurry containing either positive or negative electrode active material is prepared as ink and then printed/sprayed on the film by an inkjet printer. The positive electrodes 12 and the negative electrodes 13 may also contain a conductive material, lithium salt, and the like, in addition to the active material. In order to improve ion conductivity, polymer electrolyte may be dispersed in the positive electrode 12. The amounts of the above materials to be compound are not particularly limited.

A manufacturing method of the cell assembly 1 is described below.

In the present embodiment, the electrodes of the cell assembly 1 are formed using an inkjet printing system.

Prior to printing by the inkjet printing system, positive electrode ink to be the positive electrodes 12 and negative ink to be the negative electrodes 13 are prepared.

Ingredients of positive electrode ink include at least the positive active material. The rest of the ingredients may be a conductive material, a raw material of polymer electrolyte, lithium salt, a polymerization initiator, and a solvent. The positive electrode ink may contain a raw material of polymer electrolyte such as macromer of ethylene oxide and propylene oxide, as well as a polymerization initiator such as benzyl dimethyl ketal. Positive electrode layers may be printed using this positive electrode ink and then polymerized so that ion conductivity of the electrode layers is improved. These ingredients are added to and mixed with a solvent. A solvent is not particularly limited but may be acetonitrile.

The compound ratio of the ingredients of the positive electrode ink is not particularly limited. However, the viscosity of the positive electrode ink should be low enough to be printed using the inkjet printing system. To maintain low viscosity, the amount of a solvent can be increased, or the temperature of the positive electrode ink can be increased. Yet, too much solvent causes a decrease in the active material per unit volume in the electrode layer. Therefore, it is preferred to keep the amount of a solvent minimum. Alternatively, a raw material of polymer electrolyte and other compounds may be modified so that they have low viscosity.

Ingredients of negative electrode ink include at least the negative electrode active material. The other ingredients may be a conductive material, a raw material of polymer electrode, lithium salt, a polymerization initiator, and a solvent.

The negative ink may contain a raw material of polymer electrolyte such as macromer of ethylene oxide and propylene oxide, as well as a polymerization initiator such as benzyl dimethyl ketal. Negative electrode layers may be printed using this negative electrode ink and then polymerized so that ion conductivity of the electrode layers is improved. These ingredients are added to and mixed with a solvent. A solvent is not particularly limited but may be acetonitrile.

The compound ratio of the ingredients of the negative electrode ink is not particularly limited. Similarly to the positive electrode ink, the viscosity of the negative electrode ink is adjusted so that the ink is printed using the inkjet printing system.

The viscosity of each ink supplied into an inkjet device is not particularly limited as long as it is low enough for the use in the inkjet device. The preferred degree of viscosity is in the order of 0.1 to 50 cP.

The electrodes are formed by using an inkjet printing technology, spraying minute droplets of ink onto the solid electrolyte film 11 that serves as a base material. These droplets form the image of predetermined electrode patterns.

Good workability is realized if the electrodes are formed into a pattern based on an image created on a computer. Creation of electrode patterns and forming electrodes with a computer are similar to image creation and printing using a general use computer and printer.

Electrode pattern used in this embodiment has a plurality of square-shaped electrode areas on which the positive electrodes 12 and negative electrodes 13 are formed. The electrode areas are matched in position and size so that the positive and negative electrodes 12 and 13 formed thereon can face each other and be laid on one another.

The positive electrode slurry is supplied into an inkjet device and sprayed as droplets so that the droplets strike the solid electrolyte film 11 and are built thereon into a pattern which is designed in advance. Ink spraying unit used in the inkjet device may be any one of a piezo inkjet type, a thermal inkjet type, and a bubble jet (registered trademark) system. However, a piezo inkjet type, which sprays ink droplets using a volume change of a piezo-electric element, is preferred.

It is preferred that the volume/size of droplets sprayed by the inkjet device ranges from 1 to 100 picoliters. If the volume/size of droplets is too small, a reduction in vibration may not be sufficient. On the other hand, if the volume/size of droplets is too large, a reduction in vibration may also be insufficient. The volume/size of the droplets sprayed by the inkjet printer is almost invariable, and the thickness and properties of the electrodes formed are thus highly uniform.

If the thickness of the electrode formed by a single coating of the electrode layer of the sprayed droplets is not enough, the ink can be sprayed again or more onto the same areas where the first coatings of the electrode layer are formed, to gain the thickness of the electrodes. In other words, the ink material is sprayed over the electrode layer of the same material. With this method, the electrode layers having a uniform thickness are stacked, thus increasing the thickness of the electrodes. The uniformity of each electrode layer formed by a single coating with the inkjet printing system is very high. Therefore, the uniformity of each electrode formed of the plurality of the electrode layers can remain very high.

Either the positive electrodes 12 or the negative electrodes 13 are first formed by the inkjet printing system on one side of the solid polymer film 11. Thereafter, the electrodes are dried so that a solvent is completely evaporated and thus removed. Similarly, the negative electrodes 13 or the positive electrodes 12, which have not been formed yet, are then formed on the other side of the solid electrolyte film 11.

Where a raw material of polymer electrode is compounded in the electrodes, a polymerization process may be carried out to form polymer electrolyte. For example, electrode slurry containing a photo-polymerization initiator is prepared in advance and printed into a pattern by the inkjet printing system. Thereafter, before being dried, the printed slurry is illuminated with ultraviolet ray or the like to initiate polymerization. The slurry is then completely dried. Thus, the electrodes are completed.

The average thickness of the electrode layers formed in the above manner ranges from 5 to 300 μm. Since the electrode layers are formed with the inkjet printing system, the electrodes can have such a uniform thickness and the surfaces thereof can be flat.

Moreover, even with the average thickness stated above, the completed electrode layers are very flat, and the maximum thickness of the electrode layers is 105% or less of the minimum thickness of the same. This superior flatness can prevent uneven heating, thus prolonging the battery life, and further can prevent cracks and breakage of the battery caused by a resonance.

The area of each electrode surface is not particularly limited. It is determined based on the surface area of a single solid electrolyte film 11 and the number of electrodes formed thereon.

Between the unit cells formed on the single solid electrolyte film 11, there is no ion conduction between neighboring positive electrodes, between neighboring negative electrodes, and between one of the positive electrodes and all the negative electrodes except the negative electrode opposite to the positive electrode (or vise versa). This means that the unit cells can function electrically independently even though they are on the same solid polymer electrolyte film. Ion passes only through a part of the solid electrolyte film 11 sandwiched between the positive electrode and the negative electrode that face each other. Ion does not flow through the outer part thereof.

A solid electrolyte film 11 may also be formed using a mesh sheet made of an ion insulating material with mesh holes whose number is equal to the number of the electrodes, the mesh holes are filled with solid electrolyte. In such a solid electrolyte film 11, ion migration/transportation between mesh holes can be blocked, thus defining passages of ion.

Next, a plurality of collector electrodes 22 are separately formed on the first side of an insulating board 21 which constitutes the collector electrode plate 2 on the positive electrode side. The collector electrodes 22 are formed at the positions corresponding to the positions of the positive electrodes 12 on the cell assembly 1 neighboring the collector electrode plate 2. A plurality of collector electrodes 32 are formed on the first side of an insulating board 31 which constitutes the collector electrode plate 3 on the negative electrode side. The collector electrodes 32 are formed at the positions corresponding to the positions of the negative electrodes 13 on the cell assembly neighboring the collector electrode plate 3. On the second side of the insulating board 21, wiring 23 is formed. The wiring 23 is connected to each collector electrode 22 through via holes (not shown) provided on the insulating board 21. Similarly to this, wiring 33 is provided on the second side of the insulating board 31. The wiring 33 is connected to each collector electrode 32 through via holes (not shown) provided in the insulating board 31.

In this embodiment, as shown in FIG. 1, the wiring 23 and 33 is arranged so that the four rows of cells are connected to each other in parallel, and then the groups having four rows of cells are connected to each other in parallel.

Moreover, a connection interrupter 4 is provided between each collector electrode 22 and the wiring 23 only on the collector electrode plate 2 on the positive electrode side.

The plurality of stacked cell assemblies 1 are sandwiched between the collector electrode plates 2 and 3, thus forming one battery. A battery electrode terminal 25 is provided at the end of wiring in the collector electrode plate 2. Although not illustrated in FIG. 1, a similar battery electrode terminal is provided on the collector electrode plate on the negative electrode side.

The insulating boards 21 and 31 constituting the collector electrode plates 2 and 3, respectively, are made of, for example, epoxy resin or phenol resin used for a print wiring board, or ABS resin. A copper film or aluminum film is used to form the collector electrodes 22 and 32 and wiring 23 and 33 on the insulating boards 21 and 31 using a print wiring technology.

Next, each connection interrupter 4 functions as a temperature detector for detecting temperature of the row of cells to which the connection interrupter 4 is connected. The connection interrupter 4 also functions as a breaker device for disconnecting the row of cells from other rows of cells. Specifically, a thermal fuse may be used as the connection interrupter 4 as it has both functions of the temperature detector and the breaker device.

Figure 3:
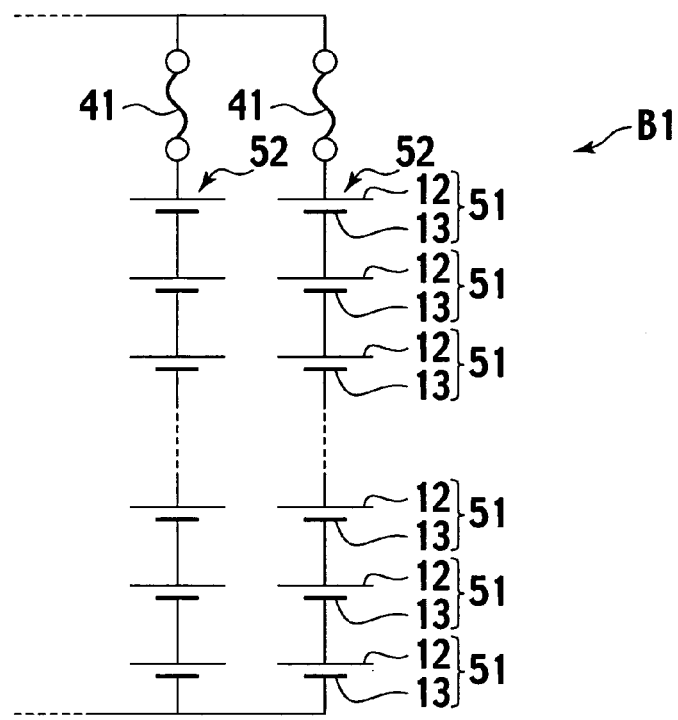
FIG. 3 is a view of an equivalent circuit of a battery of a first embodiment.

FIG. 3 is a view of an equivalent circuit of the battery including thermal fuses.

In this battery, the unit cells 51, each having the positive and negative electrodes 12 and 13 formed on the single solid electrolyte film 11, are connected to each other in series, thus forming rows of cells 52. Further, the rows of cells 52 are connected to each other in parallel. The connection interrupter (the thermal fuse 41) is provided in each of the rows of cells 52.

Next, the operation of the battery of this invention is described.

The battery having the above-described construction is manufactured in a manner that the plurality of unit cells is formed on the same solid electrolyte film in the same process. Therefore, differences between the properties of the parallel-connected unit cells are extremely small. This prevents deterioration of the charge-discharge cycle life of any one of the parallel-connected unit cells or rows of cells.

This battery is also provided with the thermal fuse 41 as the connection interrupter 4 in each row of cells. The thermal fuse 41 interrupts the circuit of the row once the temperature thereof exceeds a set level.

This means that, if one of the rows of cells 52 reaches or exceeds temperature set at the thermal fuse 41, only the row of cells 52 is disconnected from the parallel-connected circuits of the battery. Even when the temperature decreases, the thermal fuse is not recovered. Therefore, the defective row of cells 52 remains disconnected.

It is considered that temperature of each row of cells 52 increases in the following cases; one of the unit cells 51 in the row of cells 2 is overcharged or over-discharged; internal resistance of the unit cell 51 is increased; or current increases due to short-circuit within the unit cell 51. In the above cases, temperature of the row of cells 52 rapidly increases compared to the other rows of cells. Then, once the temperature of the row of cells 52 exceeds temperature at which circuit interruption occurs, the row of cells 52 with the above problem is disconnected from the circuits of the battery.

The circuit interruption temperature of the thermal fuse 41 should be a temperature at which the above-mentioned problem occurs. In reality, the circuit interruption temperature of the thermal fuse 41 varies depending on various conditions such as the number of stacked cell assemblies 1, the area of the electrode, the thickness of the solid electrolyte layer, the construction of a package where the battery is housed, and a cooling mechanism. Thus, the circuit interruption temperature should be appropriately set depending on the above conditions so that the circuit can be interrupted when a problem happens.

By using the thermal fuse 41 as described above, the row of cells 52 disconnected from the circuits is no longer charged and discharged after the defect happens and thus has no influence on the other rows of cells. In other words, where a defect happens in one of the unit cells in one of parallel-connected the rows of cells, the entire row of cells is disconnected from the circuits because of the rows of cells are wired in parallel. Therefore, for example, even if not only internal resistance increases, which cause bad continuity or the like, but also short-circuit happens, the defective row of cells has no flow of current which bypasses the other rows of cells connected to the defective row of cell in parallel. Therefore, the battery B1 as a whole can maintain its properties using the normal rows of cells.

The number of rows of cells disconnected from the circuits as above is described below.

First of all, during actual manufacturing of the battery, the number of problems in unit cells which can occur in the manufacturing process is counted. Defects are often caused by contaminant particles such as metal particles or micro dust which contaminate the unit cells during the manufacturing process. Hence, if the number of contaminant particles in each unit cell is the same, it is possible to decrease areas of defective unit cells by increasing the number of electrodes (i.e. by increasing the number of separated pieces of electrodes) on each cell assembly.

For example, if there are 100 layers of cell assemblies 1, the percentage of defective unit cells within each cell assembly 1 is 3%, and the number of separated electrodes in each cell assembly 1 is 40, the rate of defectives occurring in the whole battery will be 3/40=0.075. This means the percent defectives will be 7.5%.

In order to reduce the percent defectives, the number of separated electrodes is increased. For example, if there are 100 layers of cell assemblies 1, the number of separated electrodes can be 100, 140, 234 and 350 to maintain the rate of defectives occurring in the unit cells within the whole battery at 7% or lower, 5% or lower, 3% or lower, and 2% or lower, respectively.

By decreasing the rate of defectives occurring in the unit cells within the battery, the number of unit cells which normally operate when a defect occurs increases. Moreover, an increase in the number of separated electrodes decreases an area of an electrode of a defective unit cell. Therefore, the area of normally-operating unit cells is relatively increased, and the entire capacity of the battery thus increases as a whole.

Second Embodiment

In the first embodiment, the thermal fuses are used to detect temperature to disconnect a defective row of cells. In the second embodiment, instead of using the thermal fuses, normal fuses operating in accordance with a magnitude of current is used as connection interrupters. The normal fuse serves as a current measurement device and a breaker device. The rest of the construction of a battery is similar to that of the first embodiment, and thus description thereof is omitted.

Figure 4:
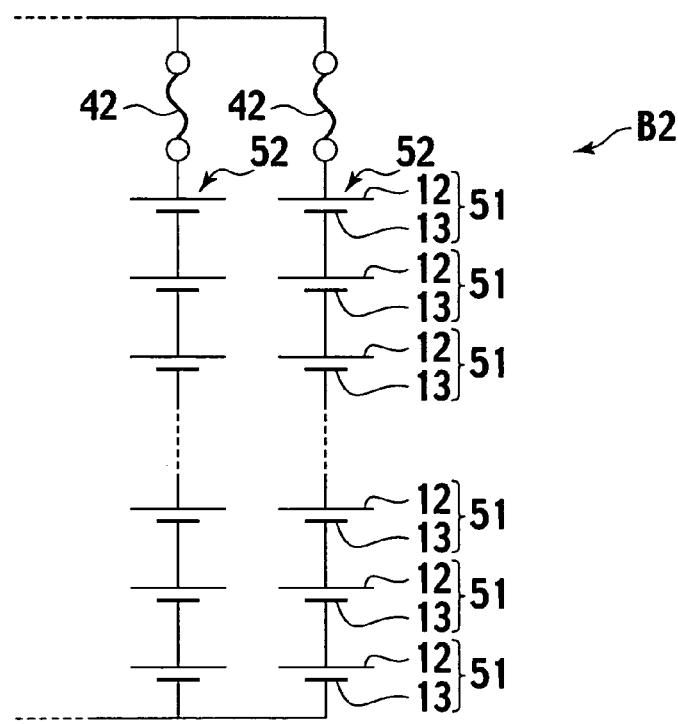
FIG. 4 is a view of an equivalent circuit of a battery of a second embodiment.

FIG. 4 is a view of an equivalent circuit of a battery B2 in which the normal fuses 42 are provided.

With the normal fuse 42 provided in each row of cells 52, the row of cells 52 is disconnected from the circuits once current at a predetermined value or greater flows through the row of cells 52. Since the fuser 42 will never be recovered, the defective row of cells 52 will remain disconnected from the circuits. This means that, where current exceeding a predetermined value flows thorough any of the rows of cells 52, the row of cells is disconnected from the circuits and will no longer be charged and discharged. Thus, the row of cells does not influence the other rows of cells, and the battery B2 can maintain its properties as a whole.

The value of current flowing through the series-connected normal unit cells in a normal situation varies depending on various conditions including the number of the cell assemblies 1, the area of electrode, and the thickness of the solid electrolyte layer. It is preferred to choose fuses which disconnects the circuits at an upper limit of current in the normal situation so that occurrence of defects in unit cells can be detected as disconnection of the circuit.

Third Embodiment

In the third embodiment, a battery is provided with a voltmeter 61 and a control circuit 62. The voltmeter 61 serves as a voltage measurement device, and the control circuit 62 serves as a breaker device which controls a switch provided in each row of cells. The construction of the connection interrupter is the only difference between the construction of the battery and that of the first embodiment. The rest of the construction is similar to that of the first embodiment, and the description thereof is thus omitted.

Figure 5:
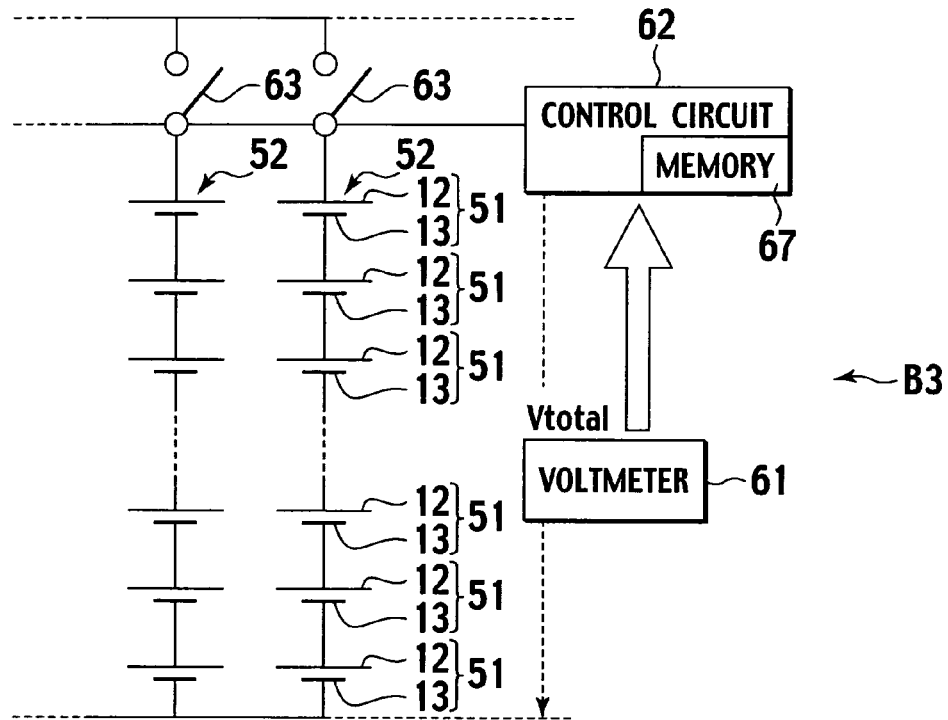
FIG. 5 is a view of an equivalent circuit of a battery of a third embodiment.

FIG. 5 is a view of an equivalent circuit of the battery B3 in which the voltmeter 61 and control circuit 62 are provided.

There is at least one voltmeter 61 and one control circuit 62 in the entire battery. In addition, a switch 63 is provided between each row of cells 52 and wiring which connects the rows of cells 52 in parallel to each other. The switch 63 is turned on and off by the control circuit 62.

The voltmeter 61 measures volt Vtotal of the entire circuit.

The switch 63 is not particularly limited as long as it turns on and off in accordance with commands from the control circuit 62.

The control circuit 62 controls the switches 63 so that they turn on and off. The control circuit 62 includes a memory 67 and disconnects a defective row of cells 52 from the circuits in accordance with the value of the voltmeter 61 by the later-described operation. It is preferred to use a non-volatile memory as the memory 67.

The control circuit 62 sequentially turns on all switches 63 (while one of the switches is on, the rest of switches are off). The voltage value of each row of cells measured by the voltmeter 61 while the switch is on is stored in the memory 67. Thus, the voltage value of each row of cells is measured separately.

If one of the stored voltage values of the rows of cells 52 is over tolerance, the control circuit 62 turns off the switch 63 of the row of cells with such voltage value, and disconnect the switch 63 from the circuits electrically. The control circuit 62 then turns on the switches 63 of the rest of rows of cells with the voltage values within the tolerance.

The control circuit 62 disconnects a row of cells 52 with abnormal voltage by referring to the memory 67. Therefore, the disconnected row of cells 52 is no longer charged or discharged and thus has no influence on the other rows of cells. Accordingly, the battery B3 can maintain its properties as a whole.

The tolerance of voltage values varies depending on various conditions including the number of stacked cell assemblies 1, the area of electrode, the thickness of the solid electrolyte layer, and the like. Therefore, it is preferred to set tolerance of voltage values with which occurrence of defects can be detected, for example, a range of voltage values in a normal situation.

Wiring for voltage measurement may be provided in the collector electrode plate 2 on the positive electrode side and the collector electrode plate 3 on the negative electrode side, respectively. Each wiring may be gathered at the connector of each collector electrode plate, and a harness or the like may be connected to the connector. Thus, wiring for voltage detection is formed. The voltmeter may be provided to this wiring.

Fourth Embodiment

In the fourth embodiment of the present invention, a battery is provided with a voltmeter 71, a current meter 73, and a control circuit 72. The voltmeter 71 serves as a voltage measurement device, the current meter 73 serves as a current measurement device, and the control circuit 72 serves as a breaker device controlling a switch provided in each row of cells. The construction of connection interrupter is the only difference between the construction of the battery and that of the first embodiment. The rest of the construction is similar to that of the first embodiment, and the description thereof is thus omitted.

Figure 6:
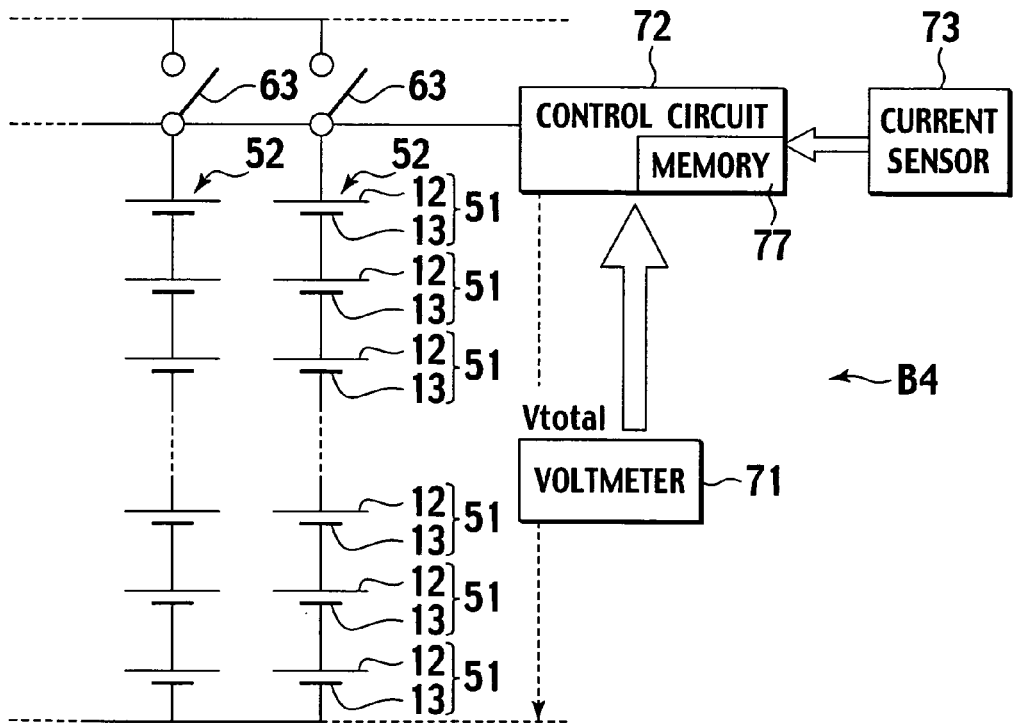
FIG. 6 is a view of an equivalent circuit of a battery of a fourth embodiment.

FIG. 6 is a view of an equivalent circuit of a battery B4 in which the voltmeter 71, current meter 73, and control circuit 72 are provided.

There are at least one voltmeter 71, one current meter 73 and one control circuit 72 in the whole battery. In addition, a switch 63 is provided between each row of cells 52 and wiring which connects the rows of cells in parallel. The switch 63 is turned on and off by the control circuit 72.

The voltmeter 71 measures voltage Vtotal of the entire circuit.

The current meter 73 measures current Itotal of the entire circuit.

The control circuit 72 controls the switches so that they are turned on and off. The control circuit 72 also includes a memory 77 serving as a storage device and disconnects a defective row of cells from the circuits based on the values of the voltmeter 71 and current meter 73 by the later-described operation. It is preferred to use a non-volatile memory as the storage device.

The control circuit 72 sequentially turns on all switches 63 (while one of the switches is on, the rest of switches are turned off). The values measured by the voltmeter 71 and current meter 73 for each row of cells are stored in the memory 77. Thus, the voltage values and current values of each row of cells are measured separately.

If the values among the stored voltage and current values of the rows of cells 52 is over tolerance, the control circuit 72 turns off the switch 63 of the row of cells with such voltage and current values, and disconnects the switch 63 from the circuit electrically. The control circuit 72 then turns on the switches 63 of the rest of rows of cells with the voltage and current values within the tolerance.

The control circuit 72 disconnects a row of cells with abnormal voltage and/or current by referring to the memory 77. Therefore, the disconnected row of cells is no longer charged or discharged and thus has no influence on the other rows of cells. Accordingly, the battery B4 can maintain its properties as a whole.

The tolerance of voltage and current values varies depending on various conditions including the number of stacked cell assemblies 1, the area of electrode, and the thickness of the solid electrolyte layer. Therefore, it is preferred to set the tolerance of voltage and current values with which occurrence of defects can be detected, for example, ranges of voltage and current values in a normal situation.

In other words, a battery B1, B2, B3, B4 according to the present invention comprising: a solid electrolyte film 11; and a plurality of unit cells 51 formed on the solid electrolyte film 11 and connected in parallel, each of the unit cells 51 comprising: a positive electrode 12 provided on one side of the solid electrolyte film 11; a negative electrode 13 provided on the other side of the solid electrolyte film 11 at a position opposite to the positive electrode 12; a part of the solid electrolyte film 11 sandwiched between the positive electrode 12 and the negative electrode 13; and a connection interrupter 4 for interrupting an electrical connection between the unit cells 51.

According to this construction of the battery, unit cells 51 have a single common solid electrolyte film. Therefore, the unit cells can obtain uniform properties. Therefore, the degrees of loads on the unit cells become equal to each other, extending the life of the unit cells. Moreover, once one of the unit cells becomes defective, the connection interrupter can electrically disconnect the defective unit cell. Hence, the defective unit cell does not affect the other unit cells connected in parallel.

Further, a battery B1, B2, B3, B4 according to the present invention comprising: a plurality of sold electrolyte films 11 stacked on one another, each having a plurality of unit cells 51 formed thereon, each of the unit cells 51 comprising: a positive electrode 12 provided on one side of the solid electrolyte film 11; a negative electrode 13 provided on the other side of the solid electrolyte film 11 at a position opposite to the positive electrode 12; and a part of the solid electrolyte film 11 sandwiched between the positive electrode 12 and the negative electrode 13; a plurality of parallel-connected rows of cells 52, each of the rows of cells 52 comprising the unit cells 51 connected in series between the solid electrolyte films 11; and a connection interrupter 4 for interrupting an electrical connection between the rows of cells 52.

According to this construction of the battery, each row of cells is configured by stacking unit cells. These unit cells are configured by a solid electrolyte film that is commonly used by each row of electrode. Therefore, the unit cells can obtain uniform properties. In addition, the degrees of loads on the parallel-connected rows of cells thus become equal to each other, extending the life of the unit cells which constitute the row of cells. Moreover, once one of the unit cells becomes defective, a connection interrupter can electrically disconnect a row of cells including the defective unit cell. Hence, the row of cells including the defective unit cell does not affect the other rows of cells that are connected in parallel to each other.

The preferred embodiments described herein are illustrative and not restrictive, and the invention may be practiced or embodied in other ways without departing from the spirit or essential character thereof.

For example, in the aforementioned embodiments, a plurality of cell assembles are stacked to form rows of cells, each having a plurality of series-connected unit cells. The rows of cells are then connected to each other in parallel, thus constituting the battery. In stead of this, the battery can be constructed only by a unit cell assembly, on which unit cells are formed and connected to each other in parallel. Alternatively, the above-mentioned unit cell assembly (that is, the battery in which the plurality of unit cells are connected to each other in parallel) can be connected to other unit cell assembly(ies) in series. In this case, similarly to the foregoing embodiments, there are almost no variations of the properties of the unit cells, and thus there is little deterioration of the charge-discharge cycle life when the unit cells are connected in parallel. In addition, by providing the connection interrupter similarly to the foregoing embodiments, a defective unit cell can be disconnected from the circuits to eliminate influences on the other unit cells.

In the foregoing third and fourth embodiments, the drawings (FIGS. 5 and 6) illustrate one voltmeter, one current meter, and one control circuit provided for the plurality of rows of cells. However, the number of them is not necessarily one for the entire battery. The voltmeter, current meter, and control circuit can be used for each group of rows of cells, and thus the battery has a plurality of voltmeters, current meters, and control circuits.

Furthermore, in the foregoing embodiments, the connection interrupter is provided in the collector electrode plate on the positive electrode side. However, the connection interrupter can of course be provided on the negative electrode side.

It is preferred to use the battery of the present invention as a battery for a vehicle such as an electric vehicle and hybrid electric vehicle, where electric power of the battery is used for a motor which is a driving source.

The scope of the invention being indicated by the claims, and all variations which come within the meaning of claims are intended to be embraced herein.

The present disclosure relates to subject matters contained in Japanese Patent Application No. 2003-420741, filed on Dec. 18, 2003, the disclosure of which is expressly incorporated herein by reference in its entirety.

What is claimed is:

1. A battery comprising:
a plurality of solid electrolyte films stacked on one another, each having a plurality of unit cells formed thereon, each of the unit cells comprising:
a positive electrode disposed on a first side of the solid electrolyte film;
a positive electrode contact region located on the first side of the solid electrolyte film, the positive electrode contact region formed on the positive electrode and adapted to make an electrical contact of the positive electrode on the first side of the solid electrolyte film;
a negative electrode disposed on a second side of the solid electrolyte film at a position opposite to the positive electrode;
a negative electrode contact region located on the second side of the solid electrolyte film, the negative electrode contact region formed on the negative electrode and adapted to make an electrical contact of the negative electrode on the second side of the solid electrolyte film; and
a part of the solid electrolyte film sandwiched between the positive electrode and the negative electrode, wherein
the plurality of unit cells formed on each of the solid electrolyte films, excluding two outermost solid electrolyte films, not being electrically connected in parallel to each other,
the unit cells on one solid electrolyte film being electrically connected in series to unit cells on another solid electrolyte film immediately adjacent to the one solid electrolyte film, respectively, thereby forming a plurality of rows of series-connected unit cells,
the unit cells on one outermost solid electrolyte film being electrically connected in parallel to each other,
the unit cells on the other outermost solid electrolyte film being electrically connected in parallel to each other, and
the rows of series-connected unit cells are electrically connected in parallel.

2. The battery according to claim 1, further comprising:
a connection interrupter for interrupting an electrical connection between the rows of cells.

3. The battery according to claim 2, wherein,
when temperature of one of the rows of cells reaches or exceeds a predetermined value, the connection interrupter interrupts the electrical connection of the row of cells to isolate the row of cells.

4. The battery according to claim 2, wherein,
when current of one of the rows of cells reaches or exceeds a predetermined value, the connection interrupter interrupts the electrical connection of the row of cells to isolate the row of cells.

5. The battery according to claim 2, wherein,
when voltage of one of the rows of cells reaches or exceeds a predetermined value, the connection interrupter interrupts the electrical connection of the row of cells to isolate the row of cells.

6. The battery according to claim 1, wherein
any of the positive electrodes and the negative electrodes is formed by spraying a material containing an electrode active material on the solid electrolyte film, using inkjet technology.

* * * * *